US012601706B2

(12) United States Patent (10) Patent No.: US 12,601,706 B2
Sliozberg (45) **Date of Patent: *Apr. 14, 2026**

(54) ANALYTE SENSOR AND A METHOD FOR ITS PRODUCING

(71) Applicant: Roche Diabetes Care, Inc., Indianapolis, IN (US)

(72) Inventor: Kirill Sliozberg, Mannheim (DE)

(73) Assignee: ROCHE DIABETES CARE, INC., Indianapolis, IN (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/442,749

(22) Filed: Feb. 15, 2024

(65) Prior Publication Data

US 2024/0272114 A1 Aug. 15, 2024

Related U.S. Application Data

(63) Continuation of application No. PCT/EP2022/072811, filed on Aug. 16, 2022.

(30) Foreign Application Priority Data

Aug. 18, 2021 (EP) ..................................... 21191836

(51) Int. Cl.
 *G01N 27/30* (2006.01)
 *G01N 27/327* (2006.01)
 *G01N 27/403* (2006.01)
(52) U.S. Cl.
 CPC ......... *G01N 27/403* (2013.01); *G01N 27/301* (2013.01); *G01N 27/3272* (2013.01)
(58) Field of Classification Search
 CPC ......... G01N 27/307; G01N 27/30–301; G01N 27/308–31; G01N 27/327–3272; G01N 27/403
 See application file for complete search history.

(56) References Cited

U.S. PATENT DOCUMENTS

2006/0263763 A1 11/2006 Simpson et al.
2009/0156920 A1 6/2009 Kotzan et al.
(Continued)

FOREIGN PATENT DOCUMENTS

WO WO 2010/099507 A1 9/2010
WO WO 2015/156966 A1 10/2015

*Primary Examiner* — James Lin
*Assistant Examiner* — Vivian A Tran
(74) *Attorney, Agent, or Firm* — Woodard, Emhardt, Henry, Reeves & Wagner, LLP

(57) ABSTRACT

An analyte sensor for determining at least one analyte and a method for producing an analyte sensor are disclosed. The analyte sensor comprises:
 a substrate;
 a working electrode and a conductive layer located on different sites on the substrate;
 a silver comprising layer partially covering the conductive layer; and
 a protective layer, which
  comprises at least one electrically conductive material; and
  covers the silver comprising layer apart from at least one at least one hole that provides access for at least one body fluid comprising the at least one analyte to the silver comprising layer.
Although the analyte sensor as disclosed herein has a reduced overall size, sufficient space is, nevertheless, provided for the silver comprising layer coated by the protective layer while, concurrently, further sufficient space remains which is neither coated by the silver comprising layer nor by the protective layer.

16 Claims, 2 Drawing Sheets

(56) References Cited

U.S. PATENT DOCUMENTS

Figures 1, 2:
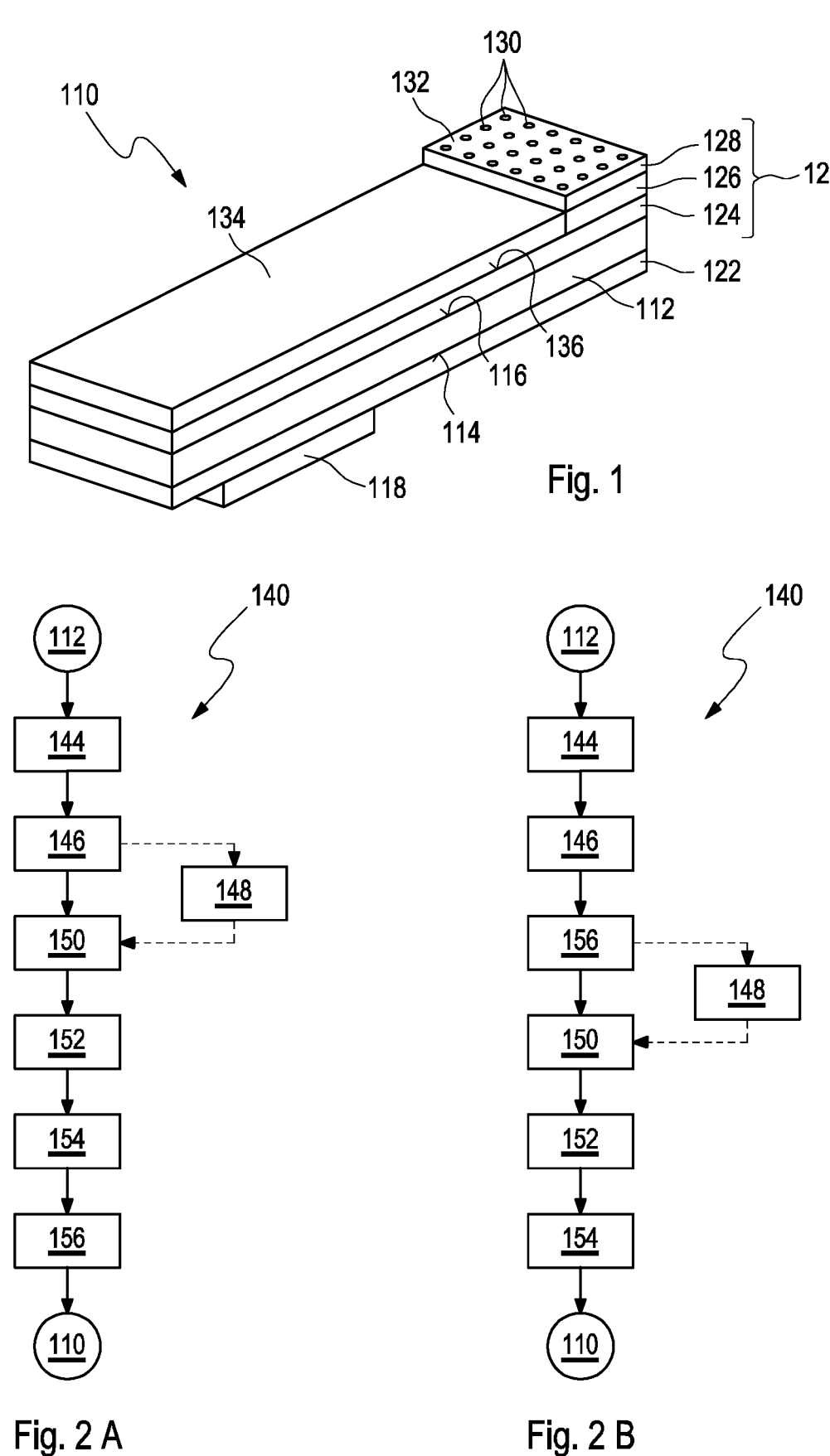

| | | | |
|---|---|---|---|
| 2010/0025238 A1* | 2/2010 | Gottlieb ............. | A61B 5/14532 204/403.01 |
| 2010/0094112 A1* | 4/2010 | Heller ................ | A61B 5/14865 600/345 |
| 2010/0230285 A1* | 9/2010 | Hoss .................... | A61B 5/1473 600/347 |
| 2011/0230735 A1 | 9/2011 | Wolfe et al. | |
| 2019/0254574 A1* | 8/2019 | Buck ................... | G01N 27/327 |
| 2020/0245908 A1 | 8/2020 | Achmann et al. | |
| 2021/0236028 A1* | 8/2021 | Mccanless ......... | A61B 5/14503 |

* cited by examiner

ANALYTE SENSOR AND A METHOD FOR ITS PRODUCING

FIELD OF THE INVENTION

The present invention relates to an analyte sensor for determining at least one analyte and a method for producing such an analyte sensor. The analyte sensor may, primarily, be used for determining of a concentration of at least one analyte in a body fluid, in particular of a blood glucose level. However, further applications may also be feasible.

RELATED ART

Determining of a concentration of one or more analytes in a body fluid, in particular of a blood glucose level, plays an important role in the prevention and treatment of various diseases. Without restricting further possible applications, the invention is described in the following with reference to glucose in an interstitial fluid. However, the invention can also be applied to other types of analytes. Blood glucose monitoring may, specifically, be performed by using electrochemical analyte sensors besides optical measurements. Examples of electrochemical analyte sensors for measuring glucose, specifically in blood or other body fluids, are known from U.S. Pat. Nos. 5,413,690; 5,762,770; 5,798,031; 6,129,823 A or US 2005/0013731 A1.

WO 2012/045425 A1 discloses an electrochemical sensor that employs multiple electrode areas that are exposed for contact with a body fluid, e.g., when the sensor is inserted subcutaneously into a patient's skin. The exposed electrode areas are arranged symmetrically, such that a symmetrical potential distribution is produced when an AC signal is applied to the sensor. In a particular embodiment, only one reference electrode is covered with Ag/AgCl while the other reference electrodes remain blank.

U.S. Pat. No. 9,936,909 B2 discloses devices for measurement of an analyte concentration, e.g., glucose in a host. Herein, a combined counter/reference electrode formed from silver/silver chloride is used. Further, laser ablation is used to expose the electroactive surfaces.

International patent application PCT/EP2021/055725, filed Mar. 8, 2021, discloses a fast transient measurement method for determining membrane properties in an analyte sensor. The fast transient measurement method as disclosed therein can, particularly, be used for measuring an equivalent series resistance (ESR) of the analyte sensor, wherein the measured ESR, may typically, comprise a resistance of a membrane comprised by the analyte sensor. Herein, an ionic conductivity of the membrane may correlate with a permeability of the membrane for an analyte to be determined and, consequently, with a sensitivity of the analyte sensor. The measured ESR can be used to correct a sensitivity shift in the analyte sensor, such as caused by a varying temperature, but may also be used to detect a mechanical load at an insertion site of the sensor in a body of a user, specifically, since the permeability of the membrane may, in particular, depend on a temperature, a chemical surrounding, or a mechanical load of the membrane but not on the dimensions of the membrane.

Apart from the resistance of the membrane, the measured ESR may, further depend on a geometry of the analyte sensor, especially a size of electrodes, or a distance between the electrodes, as well as on at least one coating as applied to the electrodes which can be considered as a fixed portion of the ESR. By subtracting the fixed portion of ESR from the measured ESR a variable portion of the ESR may be obtained which can, mostly, be assigned to membrane effects.

However, an analyte sensor that comprises a protective coating which is applied to isolate a major portion of an electrode in order to minimize a surface area of the electrode which is exposed to the body fluid comprising the analyte may, typically, lead to an increase in the measured ESR. Consequently, the variable portion of the ESR which can be assigned to membrane effects can, in particular, be considerably smaller compared to the fixed portion of the ESR. A reduced range of signal vs. background diminishes an effective resolution when determining membrane properties in the analyte sensor from the measured ESR. As observed, the measured ESR strongly depends on the surface area of the electrode which is exposed to the body fluid comprising the analyte, resulting in considerably different values for the background arising from inhomogeneities during sensor production. As further observed, the measured ESR can, in addition, not be used for a considerable amount of time due to a considerably long running-in period of the measured ESR.

International patent application PCT/EP2021/068429, filed Jul. 5, 2021, discloses an analyte sensor comprising a substrate, at least one working electrode, at least one second electrode and a membrane, wherein the membrane is located on top of the at least one second electrode.

European patent application 20 207 218.7, filed Nov. 12, 2020, discloses a method for producing an analyte sensor, an analyte sensor obtainable by this method, and a use of the analyte sensor. The method comprises the steps of: a) providing a first substrate having a first side, and a second side, wherein the second side has a first layer comprising a first conductive material; b) providing a second substrate having a first side, wherein the first side has a second layer comprising a second conductive material, and a second side, wherein second side has a third layer comprising a third conductive material; c) applying a layer of an conductive preparation onto at least one of the first side of the first substrate or the third layer or a portion thereof, wherein the conductive preparation comprises a plurality of conductive particles, and at least one polymeric binder; d) laminating the first side of the first substrate with the second side of the second substrate; and e) obtaining the analyte sensor.

European patent application 21 172 512.2, filed May 6, 2021, discloses an analyte sensor for determining at least one analyte and a method for producing an analyte sensor. The analyte sensor comprises: a substrate; a working electrode and a conductive layer located on different sites on the substrate; a silver comprising layer partially covering the conductive layer; and protective layer covering the silver comprising layer fully apart from at least one area accessible to at least one body fluid comprising the at least one analyte, and a portion of the conductive layer.

Problem to be Solved

It is therefore an objective of the present invention to provide an analyte sensor for determining at least one analyte and a method for producing an analyte sensor for determining at least one analyte, which at least partially avoid the shortcomings of known analyte sensors and related methods and which at least partially address the above-mentioned challenges.

In particular, it is desired to provide an analyte sensor having a reduced overall size, wherein the analyte sensor has a limited available surface area of the electrodes, wherein sufficient space is, nevertheless, provided for a silver comprising layer coated by a protective layer, and wherein, concurrently, further sufficient space remains which is neither coated by the silver comprising layer nor by the protective layer.

SUMMARY OF THE INVENTION

This problem is solved by an analyte sensor for determining at least one analyte and a method for producing an analyte sensor for determining at least one analyte having the features of the independent claims. Preferred embodiments of the invention, which may be implemented in an isolated way or in any arbitrary combination, are disclosed in the dependent claims and throughout the specification.

In a first aspect of the present invention, an analyte sensor for determining at least one analyte is disclosed, wherein the analyte sensor comprises:

a substrate;

a working electrode and a conductive layer located on different sites on the substrate;

a silver comprising layer partially covering the conductive layer; and a protective layer, which comprises at least one electrically conductive material; and covers the silver comprising layer apart from at least one hole that provides access for at least one body fluid comprising the at least one analyte to the silver comprising layer.

As generally used, the term "analyte sensor" refers to an arbitrary device being configured to perform a detection of an analyte by acquiring at least one measurement signal. As particularly preferred, the analyte sensor may be a partially implantable analyte sensor which may, particularly, be adapted for performing the detection of the analyte in a body fluid of a user in a subcutaneous tissue, particularly in an interstitial fluid. As used herein, the term "partially implantable analyte sensor" refers to an analyte sensor designated to be introduced into the body tissue of a patient or user in a fashion that a first portion of the implantable analyte sensor may be received by the body tissue while a further portion may not be received by the body tissue. For this purpose, the analyte sensor may comprise an insertable portion. Herein, the term "insertable portion" generally refers to a part or component of the analyte sensor which is configured to be insertable into an arbitrary body tissue. Other parts or components of the analyte sensor, in particular contact pads, may remain outside of the body tissue.

As generally used, both terms "user" and "patient" refer to a human being or an animal, independent from the fact that the human being or animal, respectively, may be in a healthy condition or may suffer from one or more diseases. As an example, the user or the patient may be a human being or an animal suffering from diabetes. However, additionally or alternatively, the invention may be applied to other types of users, patients or diseases.

As further used herein, the term "body fluid", generally, refers to a fluid, in particular a liquid, which is typically present in a body or a body tissue of the user or the patient and/or may be produced by the body of the user or the patient. Preferably, the body fluid may be selected from the group consisting of blood and interstitial fluid. However, additionally or alternatively, one or more other types of body fluids may be used, such as saliva, tear fluid, urine or other body fluids. During the detection of the at least one analyte, the body fluid may be present within the body or body tissue.

Thus, the analyte sensor may, specifically, be configured for detecting the at least one analyte within the body tissue.

As further used herein, the term "analyte" refers to an arbitrary element, component, or compound being present in the body fluid, wherein the presence and/or the concentration of the analyte may be of interest to the user, the patient, to medical staff, such as a medical doctor. In particular, the analyte may be or may comprise at least one arbitrary chemical substance or chemical compound which may participate in the metabolism of the user or the patient, such as at least one metabolite. As an example, the at least one analyte may be selected from the group consisting of glucose, cholesterol, triglycerides, lactate. Additionally or alternatively, however, other types of analytes may be used and/or any combination of analytes may be determined. The detection of the at least one analyte specifically may, in particular, be an analyte-specific detection. Without restricting further possible applications, the present invention is described herein with particular reference to a monitoring of glucose in an interstitial fluid.

In particular, the analyte sensor may be an electrochemical sensor. As used herein, the term "electrochemical sensor" refers to an analyte sensor which is adapted for a detection of an electrochemically detectable property of the analyte, such as an electrochemical detection reaction. Thus, for example, the electrochemical detection reaction may be detected by applying and comparing one or more electrode potentials. Specifically, the electrochemical sensor may be adapted to generate the at least one measurement signal which may, directly or indirectly, indicate a presence and/or an extent of the electrochemical detection reaction, such as at least one current signal and/or at least one voltage signal. The measurement may be a qualitative and/or a quantitative measurement. Still, other embodiments are feasible.

The electrochemical sensor as used herein is arranged in a fashion of an electrochemical cell employing at least one pair of electrodes. As generally used, the term "electrode" refers to an element which is adapted to contact the body fluid, either directly or via at least one semi-permeable membrane or layer, wherein each electrode is embodied in a fashion that an electrochemical reaction occurs at at least one surface of the electrode. In particular, the electrodes may be embodied in a manner that oxidative processes and/or reductive processes may take place at selected surfaces of the electrodes. Generally, the term "oxidative process" refers to a first chemical or biochemical reaction during which an electron is released from a first substance, such as an atom, an ion, or a molecule, that is oxidized thereby. A further chemical or biochemical reaction by which a further substance may accept the released electron is, generally, denominated by the term "reductive process". Together, the first reaction and the further reaction may also be denominated as a "redox reaction". As a result, an electrical current, which relates to moving electrical charges, may be generated hereby. Herein, a detailed course of the redox reaction may be influenced by an application of an electrical potential.

Further, each electrode comprises an electrically conductive material. As generally used, the term "electrically conductive material" refers to a substance which is designed for conducting an electrical current through the substance. For this purpose, a highly conductive material having a low electrical resistance is preferred, in particular to avoid a dissipation of electrical energy carried by the electrical current within the substance. In general, the electrically conductive material may be selected from a noble metal, especially gold; or from an electrically conductive carbon material; however, further kinds of conductive materials may also be feasible.

As further used herein, the term "determining" relates to a process of generating at least one representative result, in particular, by evaluating the at least one measurement signal as acquired by the analyte sensor. Herein, the term "evaluating" may refer to an application of methods for displaying the at least one measurement signal and deriving the at least one representative result therefrom. The at least one measurement signal may, specifically, be or comprise at least one electronic signal, such as at least one voltage signal and/or at least one current signal. The at least one signal may be or may comprise at least one analogue signal and/or may be or may comprise at least one digital signal. Especially in electrical systems, it may be required to apply a prespecified signal to a specific device in order to be able to record the desired measurement signal. By way of example, measuring a current signal may require the application of a voltage signal to the device, or vice-versa.

As further used herein, the term "monitoring" refers to a process of continuously acquiring data and deriving desired information therefrom without user interaction. For this purpose, a plurality of measurement signals are generated and evaluated, wherefrom the desired information is determined. Herein, the plurality of measurement signals may be recorded within fixed or variable time intervals or, alternatively or in addition, at an occurrence of at least one prespecified event. In particular, the analyte sensor as used herein may, especially, be configured for a continuous monitoring of one or more analytes, in particular of glucose, such as for managing, monitoring, and controlling a diabetes state.

In general, the analyte sensor may comprise a sensor body, in particular, a substrate. As used herein, the term "substrate" refers to an arbitrary element designed to carry one or more other elements disposed thereon or therein. Specifically, the substrate may be flexible and/or deformable. In particular, the substrate may be bendable. Particularly preferred, the substrate may be a planar substrate. As generally used, the term "planar" refers to a body comprising extensions in two dimensions, typically denoted as "surface" of the planar body, which exceed the extension in a third dimension, usually denoted as "thickness" of the planar body, by a factor of 2, at least a factor of 5, at least a factor of 10, or even at least a factor of 20 or more. As an example, the substrate may have a thickness of 50 µm to 1 mm, specifically of 80 µm to 500 µm, such as 110 µm to 250 µm. Using a planar substrate may, particularly, facilitate providing a flat sensor. As generally used, the term "flat sensor" refers to a particular type of analyte sensor which comprises a planar substrate that provides a carrier for the further elements, preferably the electrodes, of the analyte sensor to be provided, preferably, in form of layers, directly or indirectly, deposited on the substrate.

The substrate may, specifically, have an elongated shape, such as a strip shape or a bar shape; however, other kinds of shapes may also be feasible. As generally used, the term "elongated shape" indicates that each surface of the planar body has an extension in a direction along the elongation which exceeds an extension perpendicular hereto by at least a factor of 2, at least a factor of 5, at least a factor of 10, or even at least a factor of 20 or more.

Specifically, the planar substrate may have a first side and a second side, wherein the first side and the second side differ from each other. As generally used, the term "side" refers to a surface of the sensor body. Herein, the terms "first" and "second" are considered as description without specifying an order and without excluding an embodiment in which other elements of the same kind may be present. In a preferred embodiment, the first side and the second side may be positioned in an opposite fashion with respect to each other on the substrate.

The substrate may, preferably, be or comprise at least partially, preferably completely, at least one electrically insulating material, especially in order to avoid unwanted currents between electrically conducting elements as carried by the substrate. In a preferred embodiment, the at least one electrically insulating material may be selected from the group consisting of an insulating epoxy resin, a polycarbonate, a polyester, a polyvinylchloride, a polyurethane, a polyether, a polyethylene, a polyamide, a polyimide, a polyacrylate, a polymethacrylate, a polytetrafluorocthylene or a copolymer thereof, and alumina; however, other kinds of electrically insulating materials may also be feasible. Herein, a suitable polyester may be polyethylene terephthalate (PET).

According to the present invention, the analyte sensor comprises a working electrode and at least one further electrode, wherein the working electrode and the at least one further electrode are located on different sites on the substrate, preferably on the first side and on the second side of the substrate, wherein the first side and the second side may, preferably, be positioned on opposite sides of the substrate. In a particularly preferred embodiment, the working electrode and the at least one further electrode may be located on opposing sides of the substrate in a manner that a geometrical projection of the site of the working electrode onto the side of the substrate on which the at least one further electrode may be located does not result in overlap between the geometrical projection of the site of the working electrode and the site of the at least one further electrode. However, applying the working electrode and the at least one further electrode on different sites on the same side of the substrate, such as both on the first side or the second side of the substrate, may also be feasible.

The at least one further electrode may, preferably, be a counter electrode, a reference electrode and/or a combined counter/reference electrode. As particularly preferred, the at least one further electrode may be or comprise only a single combined counter/reference electrode, specifically in order to provide an analyte sensor having a considerably small spatial expansion particularly configured to be used as implantable sensor. If the analyte sensor has only two electrodes, it typically comprises a single working electrode and the single combined counter/reference electrode. Herein, the working electrode may have a reagent layer comprising a biorecognition component, specifically an enzyme having a redox active enzyme co-factor adapted to support an oxidation of the analyte in the body fluid. In a particularly preferred embodiment, each electrode may have a lateral extension of 0.2 mm to 10 mm, preferably of 0.5 mm to 5 mm, more preferred of 0.7 mm to 2 mm, and a thickness of 1 µm to 10 µm, preferably of 2 µm to 5 µm. However, further embodiments of the electrodes may also be feasible.

As indicated above, the at least one further electrode comprises a conductive layer, a silver comprising layer which partially covers the conductive layer; and a protective layer which covers the silver comprising layer and a portion of the conductive layer. Further portions of a particular side of the substrate may be covered, partially or completely, by an insulating layer as described below in more detail. As used herein, the term "layer" refers to a volume that comprises a material having extensions in two lateral dimensions, typically denoted as "lateral extension" or simply "extension" of the layer, which exceed the extension in a third dimension, usually denoted as "thickness" of the layer, by a factor of 2, at least a factor of 5, at least a factor of 10, or even at least a factor of 20 or more. Herein, the layer may be carried by the respective substrate, in particular, in order to provide stability and integrity to the layer. The layer may, specifically, have an elongated shape, such as a strip shape or a bar shape; however, other kinds of shapes may also be feasible. As described below in more detail, each layer may, preferably, be produced in an additive process by applying a desired material to the substrate or to an already deposited layer; however, using a further process may also be feasible. For further details, reference can be made to the description of the method below.

The conductive layer is an electrically conductive layer. As generally used, the term "electrically conductive" refers to a property of a substance of conducting an electrical current through the substance. Preferably, the conductive layer may comprise an electrically conductive material. As already defined above, the term "electrically conductive material" refers to a substance which is designed for conducting an electrical current through the substance. The electrically conductive material may, as particularly preferred, be selected from an electrically conductive carbon material; however, a further kind of conductive material, such as a noble metal, especially gold, may also be feasible.

In a further embodiment, the conductive layer may be or comprise a structured layer, such as disclosed in European patent application 20 207 218.7, filed Nov. 12, 2020. Accordingly, the electrically conductive material may be selected from the group consisting of gold, nickel, platinum, palladium, carbon, carbon paste, polyaniline and poly-3,4-ethylenedioxythiophene (PEDOT), particularly preferred, the at least one electrically conductive material is selected from the group consisting of gold, carbon, and carbon paste. More preferably, the at least one electrically conductive material consists essentially of gold and/or carbon and/or carbon past.

Further, the at least one further electrode has a silver comprising layer. As used herein, the term "silver comprising layer" refers to a particular type of layer which comprises a silver comprising substance, specifically selected from at least one of elemental silver (Ag) and a silver comprising compound, wherein the silver comprising compound may, preferably, be silver chloride (AgCl). In a preferred embodiment, the silver comprising layer may only comprise AgCl at a time when the analyte sensor is produced, wherein no elemental Ag may be added at that time. However, during use of the analyte sensor, elemental Ag may then be formed from the AgCl in a fashion that, during use, the analyte sensor may, subsequently, comprise Ag/AgCl. An analyte sensor which has a silver comprising layer that comprises Ag/AgCl is, particularly, preferred.

In a particular embodiment, the Ag/AgCl may be comprised as a plurality of conductive particles in a binder within the silver comprising layer. As generally used, the term "binder" refers to a substance designated to maintain the plurality of the conductive particles within a preparation at least partially, preferably completely, together. The conductive particles may, in particular, be dispersed within the at least one binder. Especially, the conductive particles may be homogeneously dispersed within the at least one binder. Herein, the at least one binder may be selected from the group consisting of metallic binders, ceramic binders and polymeric binders. Preferred are polymeric binders, in particular physically binding polymer binders and/or chemically binding polymer binders. By way of example, the Ag/AgCl within the silver comprising layer may comprise 50 to 70 wt.-% of Ag, 20 to 40 wt.-% of AgCl and 1 to 20 wt.-% of a binder, wherein each wt.-% is based on a sum of the wt.-% of Ag, AgCl and the binder. However, a further kind of preparation of the silver comprising layer may also be feasible.

As further indicated above, the silver comprising layer partially covers the conductive layer. As used herein, the term "partially" refers to a section of an accessible surface of the conductive layer which is covered by the silver comprising layer, wherein a remaining section of the accessible surface of the conductive layer is not covered by the silver comprising layer. As further used herein, the term "accessible surface" refers to a particular surface of a layer, such as of the silver comprising layer or of the conductive layer, not already adjoining a further surface and, thus, being ready for being covered by a further layer. Herein, the section of the conductive layer which is covered by the silver comprising layer may, preferably, be of 2% to 50%, more preferred of 5% to 40%, in particular of 10% to 30%, of the accessible surface of the conductive layer.

Further, the silver comprising electrode comprises a protective layer. As generally used, the term "protective layer" refers to a particular type of layer which is applied in order to control access to a further layer which is partially or fully covered by the protective layer. As used herein, the term "fully" refers to a complete disruption of the access to the further layer, while the term "partially" refers to a selective barrier which provides selective access to the further layer.

As further indicated above, the protective layer covers the silver comprising layer, preferably, by providing a full coverage. As used herein, the term "full coverage" refers to fully covering accessible surfaces of the silver comprising layer by the protective layer, wherein only a negligible remaining section of the accessible surfaces of the silver comprising layer may not be covered by the protective layer. For the term "accessible surface" reference can be made to the definition as provided above. In particular, the portion of the silver comprising layer which may be covered by the protective layer may, preferably, be of 90% to 100%, more preferred of 95% to 99.9%. Further, the protective layer may have a thickness of 1 μm to 100 μm, preferably of 2 μm to 50 μm, more preferred of 5 μm to 40 μm.

As further indicated above, the protective layer comprises at least one hole, wherein the at least one hole is designed to provide access to the to the silver comprising layer for the at least one body fluid comprising the at least one analyte. As generally used, the term "hole" refers to an opening and/or perforation in the protective layer, thereby allowing a passage of one or more molecules and/or compounds through the at least one hole, whereby the desired selective access to the silver comprising layer is provided for the body fluid. Herein, the total size of the holes may sum up to not more than 0.01 mm$^2$, such that the at least one hole may exhibit an individual size of 0.0005 mm$^2$ to 0.01 mm$^2$, preferably of 0.001 mm$^2$ to 0.005 mm$^2$, especially when laser ablation is used for generating the at least one hole. As further used herein, the term "size of a hole" relates to a surface area of each hole as comprised by the protective layer. Further, the number of holes may, especially, be limited by the manufacturing process used for generating the holes. Specifically when laser ablation is used for this purpose, the number of holes may be 1 to 10, preferably 2 to 5. For other manufacturing processes, the protective layer may comprise 1 to 250 holes, preferably 1 to 50 holes, more preferred 1 to 10 holes; however, a different number of holes may also be feasible. Further, the at least one hole may exhibit an arbitrary shape, wherein the shape of two individual holes may be identical or differ with respect from each other. In particular, the at least one hole may exhibit a shape of a continuous ablation line across the silver comprising layer; however, further shapes may also be conceivable.

In a particularly preferred embodiment, the at least one hole in the protective layer may be generated by using an ablative process. As generally used, the terms "ablation", "ablation process" and "ablative process" refer to structuring a layer, such as generating a hole through the layer, by using a process which is designated for removing a portion of the layer, especially in order to achieve the desired result. With respect to the present analyte sensor, the at least one hole in the protective layer may, preferably, be generated by using laser ablation. As generally used, the term "laser ablation" refers to an ablative process in which the portion of the layer is removed by using at least one laser element.

As further indicated above, the protective layer comprises at least one electrically conductive material. As already defined above, the term "electrically conductive material" refers to a substance which is designed for conducting an electrical current through the substance. The electrically conductive material may, as particularly preferred, be selected from an electrically conductive carbon material; however, a further kind of conductive material, such as a noble metal, especially gold, may also be feasible.

In a particular embodiment, the protective layer may comprise the same material as the conductive layer and may, therefore, be considered as a further conductive layer. In a particularly preferred embodiment, the protective layer can be or comprise a membrane which comprises a plurality of electrically conductive particles, wherein the plurality of the electrically conductive particles may, especially, be comprised by receiving structures within the membrane. Herein, the electrically conductive particles may, preferably, be selected from an electrically conductive carbon material; however, a further kind of conductive material, such as a noble metal, especially gold, may also be feasible. Further, the electrically conductive particles may, preferably, exhibit a size of 0.5 μm to 20 μm, preferably of 1 μm to 10 μm, more preferred of 2 μm to 5 μm, however, less than the thickness of the protective layer.

For further details concerning the membrane, specifically with regard to its properties and composition, reference may be made to International patent application PCT/EP2021/068429, filed Jul. 5, 2021, which discloses an analyte sensor comprising a membrane.

In a particularly preferred embodiment, the protective layer may be a hydrophobic layer. As used herein, the term "hydrophobic" refers to a property of the protective layer in that a protective material as comprised by the protective layer may have a water uptake of 0 to 5% by weight, preferably of less than 1% by weight, based on a total weight of the protective material. Herein, the protective material may, preferably, comprise at least one hydrophobic polymer, preferably a thermoplastic hydrophobic polymer. Specifically, the hydrophobic polymer may be selected from the group consisting of thermoplastic polyurethanes (TPU), thermoplastic polyurea, polyethylene, polypropylene, polystyrene, butyl methacrylate polymers (BUMA), polyethylene terephthalate (PET), and UV hardening resins, especially acrylated silicones, acrylated urethanes, acrylated polyesters and acrylated epoxides. In particular, the hydrophobic polymer may be or comprise a thermoplastic polyurethane. However, other types of hydrophobic polymers may also be feasible.

In the particular arrangement for the analyte sensor as disclosed herein, the protective layer, which, preferably, comprises an electrically conductive carbon material, completely covers the silver comprising layer and, concurrently, comprises at least one hole that allows mass transport during the electrochemical reaction which occurs at the silver comprising electrode. Herein, the area for the electrochemical reaction is defined by a surface area of the at least one hole, especially provided in the protective layer by using an ablative process.

Specifically, this arrangement results in a large electrically conductive carbon area, which is favorable for applying a fast transient measurement method, such as described in International patent application PCT/EP2021/055725, filed Mar. 8, 2021, in more detail. As generally used, the term "fast-transient method" as refers to at least one alteration of an electrical voltage between two electrodes, wherein the alteration may exhibit fast transient signal flanks, in particular two very steep edges. The electrical voltage as applied during the fast transient measurement method may comprise a signal selected from at least one of a square wave form, a sine wave form, or a non-continuous signal, such as a voltage pulse.

Herein, the term "pulse" refers to a signal having a transient alteration of an amplitude of the signal from a first baseline value, via a rising flank or a falling flank, to a second value, followed by a return, via a falling flank or a rising flank, to the baseline value or at least approximately to the baseline value, wherein the second value may be higher or lower than the baseline value. A pulse duration may be≤50 μs, preferably ≤20 μs, more preferred≤10 μs. In particular, the duration of a single pulse may be sufficiently long to record its propagation and may be short enough not to excite the analyte sensor in an electrochemical manner. As further generally used, the term "fast-transient" refers to time range between first and second values of the signal flank, which can, preferably, be 50 ns or below, more preferred 20 ns or below, and may be only limited by electronics such as by an analog-to-digital-converter. A faster flank and a sharper transition to a plateau as constituted by the baseline value or by the second value can increase a resolution between an ohmic part of the resistance and a capacitive part of the capacitance of the analyte sensor.

As indicated above, the fast transient measurement method can, particularly, be used for measuring an equivalent series resistance (ESR) of the analyte sensor, wherein the measured ESR may typically, comprise a resistance of a membrane comprised by the analyte sensor. Herein, an ionic conductivity of the membrane may correlate with a permeability of the membrane for an analyte to be determined and, consequently, with a sensitivity of the analyte sensor. The measured ESR can be used to correct a sensitivity shift in the analyte sensor, such as caused by a varying temperature, but may also be used to detect a mechanical load at an insertion site of the sensor in a body of a user, specifically, since the permeability of the membrane may, in particular, depend on a temperature, a chemical surrounding, or a mechanical load of the membrane but not on the dimensions of the membrane. As a result, an effective resolution of fast transient measurements can considerably be increased when determining membrane properties in the analyte sensor according to the present invention from the measured ESR.

In a further embodiment, the analyte sensor may, additionally, comprise an electrically insulating layer, which may cover remaining surfaces of the analyte sensor, specifically a portion of the conductive layer which is not covered by the silver comprising layer. Specifically, the electrically insulating layer may, preferably, be placed together with the silver comprising layer on the conductive layer in a manner both layers may, preferably fully, cover the same side, specifically the side second side, of the substrate, especially in a fashion that the electrically insulating layer may adjoin the silver comprising layer. In particular, the electrically insulating layer may be or comprise an electrically insulating varnish, preferably a photoresist and/or a solder resist; however, a further kind of electrically insulating layer may also be feasible. This embodiment may further support protecting the analyte sensor.

In a further aspect of the present invention, a method for producing an analyte sensor for determining at least one analyte, in particular for producing the analyte sensor for determining at least one analyte as described herein, is disclosed. The method comprises the following steps of:
a) providing a substrate;
b) applying a conductive layer on the substrate;
c) applying a silver comprising layer in a manner that it partially covers the conductive layer;
d) applying a protective layer, which comprises at least one electrically conductive material, in a manner that it covers the silver comprising layer;
e) generating at least one hole in the protective layer in a manner that it provides access for at least one body fluid comprising the at least one analyte to the silver comprising layer; and
f) preparing a working electrode on the substrate.

Herein, the indicated steps may, preferably, be performed in the given order, thereby commencing with step a), continuing with steps b), c), d) and c), and finishing with step f). However, as described below in more detail, step f) may also be performed any time after step a), such as directly after step a) or after step b). Further, additional steps, whether described herein or not, may be performed, too.

According to step a), a substrate is provided. Herein, the substrate may be an individual substrate already exhibiting the final sizes of the analyte sensor as indicated above or, preferably, a raw substrate. As used herein, the term "raw substrate" refers to at least one material designated to form a carrier layer to support the working electrode and the silver comprising electrode as defined above. From the raw substrate, the substrate of the analyte sensor as described elsewhere herein can be produced, specifically by cutting the raw substrate into appropriate pieces. In particular, the raw substrate may comprise an electrically insulating material. For the electrically insulating material as well as for further properties of the raw substrate, reference may be made to the description of the substrate above. However, a length and a width of the raw substrate may, in general, considerably differ from the length and the width of the substrate as comprised by the completed analyte sensor. Preferably, the raw substrate may have a length of 1 cm to 1 km, more preferred of 10 cm to 100 m, and a width of 1 cm to 10 cm, more preferred of 2 cm to 8 cm. In a preferred embodiment, the raw substrate can be provided as a roll, in particular designated for being used in a roll-to-roll process.

According to step b), a conductive layer, in particular the conductive layer as described elsewhere herein is applied on the substrate. As generally used, the term "applying" refers to an additive process by which a desired material is deposited on the substrate or to an already deposited layer; however, using a further process for producing the desired layer may also be feasible. In particular, the additive process may be selected from a known deposition process, including but not limited to silk-screen printing, slot-die coating, sputtering, vacuum evaporation, atomic layer deposition, chemical vapor deposition, spray pyrolysis, electrodeposition, anodization, electro-conversion, electro-less dip growth, successive ionic adsorption and reaction, chemical bath deposition, and a solution-gas interface technique, wherein silk-screen printing or slot-die coating may, particularly, be preferred.

According to step c), a silver comprising layer is applied in a manner that it partially covers the conductive layer. For further details concerning the silver comprising layer and the applying procedure, reference may be made to the description above.

According to step d), a protective layer, which comprises at least one electrically conductive material, is applied in a manner that it covers the silver comprising layer. For further details concerning the protection layer, the electrically conductive material, and the applying procedure, reference may be made to the description above.

According to step e), at least one hole is generated in the protective layer in a manner that it provides access for at least one body fluid comprising the at least one analyte to the silver comprising layer. In a particularly preferred embodiment, the at least one hole is generated in the protective layer by using an ablative process, specifically by using laser ablation. For further details concerning the at least one hole and a process of generating the at least one hole, reference may be made to the description elsewhere herein.

According to step f), a working electrode is prepared. For further details concerning the working electrode and the applying procedure, reference may be made to the description elsewhere herein.

According to an optional further step, the raw substrate may be cut to obtain the analyte sensor. For this purpose, the raw substrate may be cut into sheets, preferably along its width, whereby sensor strips may be formed. Herein, each sensor strip may, preferably, correspond to a single analyte sensor. In addition, the raw substrate can be cut at least once along its length, specifically before or after the raw substrate may be cut along its width. Preferably, the raw substrate may be cut using at least one laser, specifically a laser-cutting process.

In a preferred embodiment, the working electrode may, preferably, be prepared prior to cutting the raw substrate into sheets, specifically by applying an appropriate coating on a side of the raw substrate. Alternatively or in addition, the working electrode may be prepared after cutting the raw substrate into sheets, specifically by generating each individualized analyte sensor by applying an appropriate coating.

At least one further method step, whether disclosed herein or not, may also be performed. In particular, an electrically insulating layer may, according to a further step g), be applied
on the same side of the substrate as the silver comprising layer, specifically on the second side of the substrate, especially in an adjacent manner with respect to the silver comprising layer, in particular to cover remaining surfaces of the analyte sensor, specifically a portion of the conductive layer which is not covered by the silver comprising layer, as described above on more detail.

For further details with regard to the method, reference can be made to the description of the analyte sensor as provided elsewhere herein.

The analyte sensor for determining at least one analyte and the method for producing such an analyte sensor according to the present invention exhibit particular advantages with respect to the prior art. As described above, the protective layer, which comprises an electrically conductive carbon material, completely covers the silver comprising layer and, concurrently, comprises at least one hole that allows mass transport during the electrochemical reaction which occurs at the silver comprising electrode. Herein, the area for the electrochemical reaction is defined by a surface area of the at least one hole, especially provided in the protective layer by using an ablative process. In this fashion, the analyte sensor as disclosed herein can have a reduced overall size, wherein the analyte sensor may have a limited available surface area of the electrodes, wherein sufficient space can, nevertheless, be provided for the silver comprising layer coated by the protective layer, and wherein, concurrently, further sufficient space remains which is neither coated by the silver comprising layer nor by the protective layer. As a result, the analyte sensor as disclosed herein can be produced in an easier manner compared to prior art analyte sensors. In addition, further advantages are conceivable.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. Herein, in most cases, when referring to the respective feature or element, the expressions "at least one" or "one or more" will not be repeated, non-withstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the person skilled in the art will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing, the following embodiments are potential embodiments of the present invention. However, other embodiments may also be feasible.

Embodiment 1. An analyte sensor, comprising a substrate;

a working electrode and a conductive layer located on different sites on the substrate;

a silver comprising layer partially covering the conductive layer; and a protective layer, which comprises at least one electrically conductive material; and covers the silver comprising layer apart from at least one hole that provides access for at least one body fluid comprising the at least one analyte to the silver comprising layer.

Embodiment 2. The analyte sensor according to the preceding Embodiment, wherein the conductive layer, the silver comprising layer and the protective layer form at least one further electrode.

Embodiment 3. The analyte sensor according to the preceding Embodiment, wherein the at least one further electrode is selected from a group consisting of a counter electrode, a reference electrode and a combined counter/reference electrode.

Embodiment 4. The analyte sensor according to the preceding Embodiment, wherein the at least one further electrode is or comprises a single combined counter/reference electrode.

Embodiment 5. The analyte sensor according to any one of the three preceding Embodiments, wherein the at least one further electrode is located on a first side of the substrate and wherein the working electrode is located on a second side of the substrate.

Embodiment 6. The analyte sensor according to the preceding Embodiment, wherein the first side and the second side of the substrate are positioned opposite each other.

Embodiment 7. The analyte sensor according to any one of the two preceding Embodiments, wherein the working electrode and the at least one further electrode are located on the substrate in a manner that a geometrical projection of a site of the working electrode onto the second side of the substrate on which the at least one further electrode is located does not result in overlap between the geometrical projection of the site of the working electrode and the site of the at least one further electrode.

Embodiment 8. The analyte sensor according to any one of the six preceding Embodiments, wherein the at least one further electrode and the working electrode are located on the same side of the substrate.

Embodiment 9. The analyte sensor according to any one of the preceding Embodiments, wherein the conductive layer comprises an electrically conductive material selected from an electrically conductive carbon material or a noble metal, especially gold.

Embodiment 10. The analyte sensor according to the preceding Embodiment, wherein the electrically conductive material is the electrically conductive carbon material.

Embodiment 11. The analyte sensor according to any one of the preceding Embodiments, wherein the silver comprising layer comprises a silver comprising substance.

Embodiment 12. The analyte sensor according to the preceding Embodiment, wherein the silver comprising substance is selected from at least one of elemental silver or a silver comprising compound.

Embodiment 13. The analyte sensor according to the preceding Embodiment, wherein the silver comprising compound is or comprises Ag/AgCl.

Embodiment 14. The analyte sensor according to any one of the preceding Embodiments, wherein the protective layer comprises an electrically conductive material selected from an electrically conductive carbon material or a noble metal, especially gold.

Embodiment 15. The analyte sensor according to the preceding Embodiment, wherein the electrically conductive material is the electrically conductive carbon material.

Embodiment 16. The analyte sensor according to any one of the preceding Embodiments, wherein the protective layer comprises a plurality of electrically conductive particles.

Embodiment 17. The analyte sensor according to the preceding Embodiment, wherein the protective layer is or comprises a membrane which comprises the plurality of the electrically conductive particles.

Embodiment 18. The analyte sensor according to any one of the preceding Embodiments, wherein the protective layer is a hydrophobic layer.

Embodiment 19. The analyte sensor according to any one of the preceding Embodiments, wherein the at least one hole has a size of 0.0005 mm$^2$ to 0.01 mm$^2$.

Embodiment 20. The analyte sensor according to any one of the preceding Embodiments, wherein the protective layer comprises 1 to 250 holes, preferably 1 to 50 holes, more preferred 1 to 10 holes, especially 2 to 5 holes.

Embodiment 21. The analyte sensor according to any one of the preceding Embodiments, further comprising an electrically insulating layer.

Embodiment 22. The analyte sensor according to the preceding Embodiment, wherein the electrically insulating layer is placed together with the silver comprising layer on the same side of the substrate.

Embodiment 23. The analyte sensor according to the preceding Embodiment, wherein the electrically insulating layer is placed together with the silver comprising layer on the conductive layer.

Embodiment 24. The analyte sensor according to the preceding Embodiment, wherein the electrically insulating layer adjoins the silver comprising layer.

Embodiment 25. The analyte sensor according to any one of the four preceding Embodiments, wherein the electrically insulating layer is or comprises an electrically insulating varnish, preferably selected from at least one of a photoresist or a solder resist.

Embodiment 26. The analyte sensor according to any one of the preceding Embodiments, wherein the analyte sensor is a flat sensor.

Embodiment 27. The analyte sensor according to any one of the preceding Embodiments, wherein the analyte sensor is a partially implantable sensor.

Embodiment 28. The analyte sensor according to any one of the preceding Embodiments, wherein the analyte sensor is a partially implantable analyte sensor for continuously monitoring an analyte.

Embodiment 29. The analyte sensor according to any one of the preceding Embodiments, wherein the analyte sensor is an analyte sensor for continuously monitoring an analyte.

Embodiment 30. The analyte sensor according to any one of the preceding Embodiments, wherein the analyte sensor is an analyte sensor for a continuous measurement of the analyte in a subcutaneous tissue.

Embodiment 31. The analyte sensor according to any one of the preceding Embodiments, wherein the analyte sensor is an analyte sensor for a continuous measurement of the analyte in a body fluid.

Embodiment 32. The analyte sensor according to any one of the preceding Embodiments, wherein the analyte sensor is an analyte sensor for a continuous measurement of the analyte in an interstitial fluid.

Embodiment 33. The analyte sensor according to any one of the preceding Embodiments, wherein the analyte sensor is an analyte sensor for a continuous measurement of the analyte in blood.

Embodiment 34. The analyte sensor according to any one of the preceding Embodiments, wherein the analyte sensor is configured to convert the analyte into an electrically charged entity by using an enzyme.

Embodiment 35. The analyte sensor according to any one of the preceding Embodiments, wherein the analyte comprises glucose.

Embodiment 36. The analyte sensor according to the preceding Embodiment, wherein the analyte sensor is configured to convert glucose into an electrically charged entity by using an enzyme, Embodiment 37. The analyte sensor according to the preceding Embodiment, wherein the enzyme is at least one of glucose oxidase or glucose dehydrogenase.

Embodiment 38. A method for producing an analyte sensor for determining at least one analyte, in particular the analyte sensor according to any one of the preceding Embodiments, the method comprising the steps of:

a) providing a substrate;

b) applying a conductive layer on the substrate;

c) applying a silver comprising layer in a manner that it partially covers the conductive layer;

d) applying a protective layer, which comprises at least one electrically conductive material, in a manner that it covers the silver comprising layer;

e) generating at least one hole in the protective layer in a manner that it provides access for at least one body fluid comprising the at least one analyte to the silver comprising layer; and f) preparing a working electrode on the substrate.

Embodiment 39. The method according to the preceding Embodiment, wherein the at least one hole in the protective layer is generated by using an ablative process.

Embodiment 40. The method according to the preceding Embodiment, wherein the at least one hole in the protective layer is generated by using laser ablation.

Embodiment 41. The method according to any one of the preceding method Embodiments, wherein the protective layer is a hydrophobic layer.

Embodiment 42. The method according to any one of the preceding method Embodiments, wherein the protective layer is applied in a manner that it fully covers the silver comprising layer.

Embodiment 43. The method according to the preceding Embodiment, wherein the protective layer is a membrane comprising a plurality of electrically conductive particles.

Embodiment 44. The method according to any one of the preceding method Embodiments, further comprising a step of.

g) applying an electrically insulating layer on the same side of the substrate as the silver comprising layer.

Embodiment 45. The method according to the preceding Embodiment, wherein the electrically insulating layer is applied to the conductive layer on the second side of the substrate.

Embodiment 46. The method according to any one of the two preceding Embodiments, wherein the electrically insulating layer is applied in an adjacent manner with respect to the silver comprising layer.

SHORT DESCRIPTION OF THE FIGURES

Further details of the invention can be derived from the following disclosure of preferred embodiments. The features of the embodiments can be implemented in an isolated way or in any combination. The invention is not restricted to the embodiments. The embodiments are schematically depicted in the Figures. The Figures are not to scale. Identical reference numbers in the Figures refer to identical elements or functionally identical elements or elements corresponding to each other with regard to their functions.

IN THE FIGURES

Figure 3:
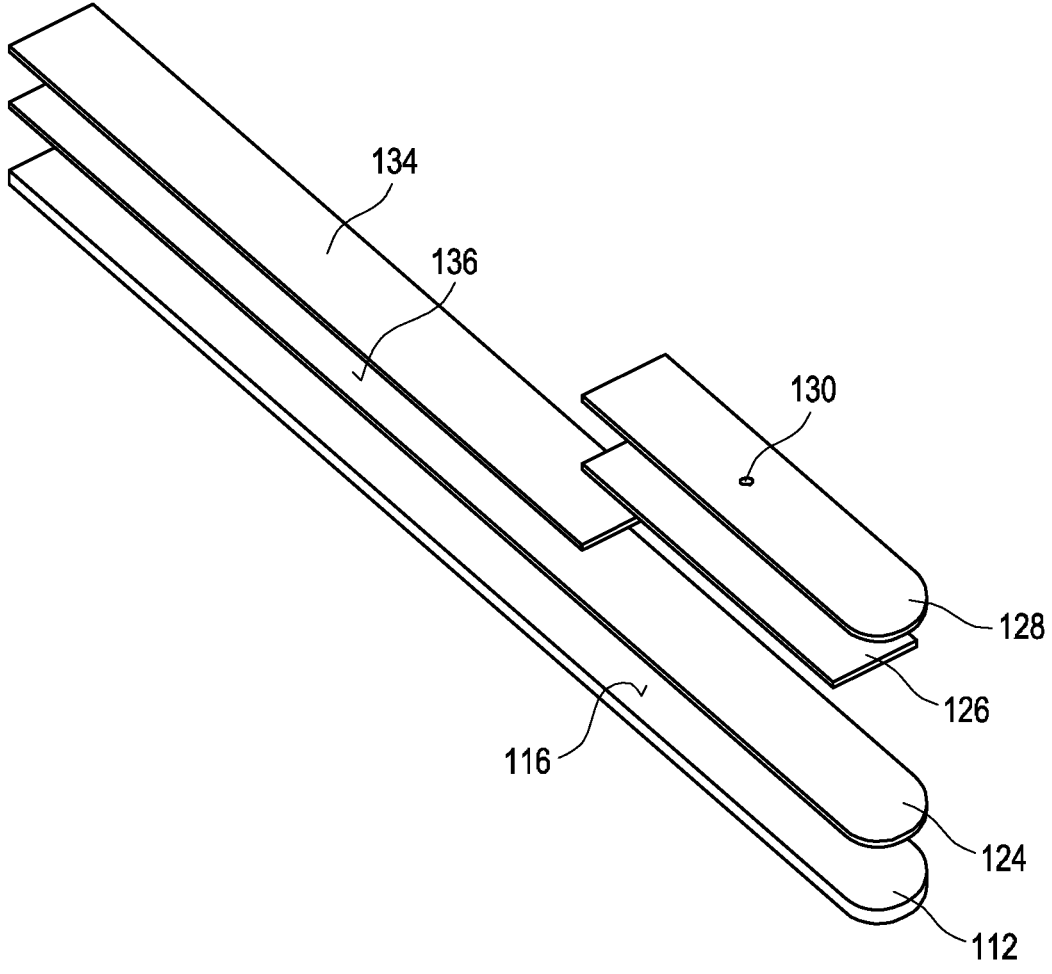

FIG. 1 schematically illustrates an aerial view of a preferred exemplary embodiment of an analyte sensor according to the present invention;

FIG. 2A schematically illustrates a preferred exemplary embodiment of a method for producing an analyte sensor according to the present invention in which the working electrode is prepared after preparing the silver comprising electrode; and FIG. 2B schematically illustrates an alternative embodiment in which the working electrode is prepared prior to preparing the silver comprising electrode;

FIG. 3 schematically illustrates an explosion drawing of a portion of a further preferred exemplary embodiment of an analyte sensor.

DETAILED DESCRIPTION OF THE EMBODIMENTS

FIG. 1 schematically illustrates an aerial view of a preferred exemplary embodiment of the analyte sensor 110 according to the present invention. It is particularly emphasized here that the dimensions as used in FIG. 1 are not to scale. The analyte sensor 110 may, as depicted there, be a flat sensor that can be partially implantable for continuously monitoring an analyte, in particular by performing a continuous measurement of one or more analytes in a subcutaneous tissue, preferably in a body fluid, especially in an interstitial fluid or in blood. For this purpose, the analyte sensor 110 may be configured to convert the one or more analytes into an electrically charged entity by using an enzyme. Specifically, the one or more analytes may comprise glucose, which may be converted into an electrically charged entity by using at least one of glucose oxidase (GOD) or glucose dehydrogenase (GHD) as the enzyme. However, the analyte sensor 110 may also be applicable to other analytes and/or to other processes for monitoring an analytic.

As illustrated in FIG. 1, the analyte sensor 110 comprises an electrically insulating substrate 112. As described above in more detail, the substrate 112 may, in particular, be an elongated planar substrate 112, specifically having a strip shape or a bar shape, which may, preferably, be flexible and/or deformable and/or bendable, and is designated for carrying the further layers as described below. Using the planar substrate 112 may, in particular, facilitate providing the flat sensor. The substrate 112 may comprise at least one electrically insulating material, preferably selected from the group as indicated above, specifically polyethylene terephthalate (PET), especially in order to avoid unwanted currents between electrically conducting elements carried by the substrate 112.

As further depicted in FIG. 1, the planar substrate 112 has a first side 114 and a second side 116, wherein the first side 114 and the second side 116 are positioned in an opposite fashion with respect to each other. In the exemplary embodiment of the analyte sensor 110 as shown in FIG. 1, a working electrode 118 is located on the first side 114 of the planar substrate 112 while a silver comprising electrode 120 is located on the second side 116 of the planar substrate 112. As further illustrated there, the working electrode 118 and the silver comprising electrode 120 are located on the substrate 112 in a manner that a geometrical projection of the site of the working electrode 118 onto the second side 116 of the substrate 112 on which the silver comprising electrode 120 is located does not result in overlap between the geometrical projection of the site of the working electrode 118 and the site of the silver comprising electrode 120. As an alternative, applying both the working electrode 118 and the silver comprising electrode 120 on different sites on the same side of the substrate 112 may also be feasible.

The silver comprising electrode 120 may, preferably, be a counter electrode, a reference electrode and/or a combined counter/reference electrode. As particularly preferred, the silver comprising electrode may be or comprise a single combined counter/reference electrode, such that the analyte sensor 110 could be considerably small to be used as implantable sensor.

As further depicted in FIG. 1, the silver comprising electrode 120 comprises a conductive layer 122, 124 which directly covers, preferably fully, both the first side 114 and the second side 116 of the substrate 114. Preferably, the conductive layers 122, 124 may comprise an electrically conductive material, specifically selected from a noble metal, especially gold; or, as particularly preferred, from an electrically conductive carbon material; however, further kinds of conductive materials may also be feasible. As an alternative, the conductive layers 122, 124 may comprise a layered structure, such as described above in more detail.

As further illustrated in FIG. 1, a silver comprising layer 126 partially covers the conductive layer 124 on the second side 116 of the substrate 114. As already indicated above, the silver comprising layer 126 may, preferably, comprise Ag/AgCl, which can, in particular, be generated from an original AgCl layer during use of the analyte sensor 110, wherein elemental Ag may be formed from the AgCl over the use of the analyte sensor 110. As further already indicated above, the portion of the conductive layer 124 which may be covered by the silver comprising layer 124 can, preferably, be of 5% to 30%, more preferred of 10% to 25%, in particular of 15% to 20%, of the surface of the conductive layer 124 on the second side 116 of the substrate 114 that is located in an opposite fashion with respect to the second side 116 of the substrate to which the conductive layer 124 is applied to.

As further depicted in FIG. 1, a protective layer 128 covers the silver comprising layer 126 on the second side 116 of the substrate 114. As further already indicated above, the silver comprising layer 126 is fully covered by the protective layer 128, in preferably of 99% to 100%, more preferred of 99.9% to 100%, specifically of 99.99% to 100%, in particular of 100%.

As further illustrated in FIG. 1, the silver comprising layer 126 may, preferably, be fully covered by the protective layer 128, however, apart from one or more holes 130 that provide access to the silver comprising layer 126 for the body fluid that comprises the one or more analytes. In general, the protective layer 128 may comprise more or less holes 130, in particular less holes 130, than depicted in FIG. 1. Herein, the holes 130 may exhibit a cylindrical shape as illustrated in FIG. 1 or not, such as one or more single lines across the protective layer 128.

As further schematically depicted here, the protective layer 128 may, preferably, be a membrane 132 which comprises the one or more holes 130 designated to provide access to the silver comprising layer 126 for the body fluid comprising the one or more analytes. As described above in more detail, the protective layer 128 comprises an electrically conductive material. In the exemplary embodiment as shown in FIG. 1, the membrane 132 may, for this purpose, preferably comprise a plurality of electrically conductive particles, especially selected from an electrically conductive carbon material; however, a further kind of conductive material, such as a noble metal, especially gold, may also be feasible.

In a particularly preferred embodiment, the one or more holes 130 may be generated by using an ablative process, specifically laser ablation. As a result, the desired selective access to the silver comprising layer 126 for the body fluid comprising the one or more analytes allows determining the one or more analytes from an interaction of the body fluid with the silver comprising layer 126.

In the exemplary embodiment as illustrated in FIG. 1, the analyte sensor 110, further, comprises an electrically insulating layer 134 which, additionally, covers a further portion 136 of the conductive layer 124. As depicted there, the electrically insulating layer 134 covers the portion 136 of the conductive layer 124 which is not already covered by or allocated for the silver comprising layer 126 but adjoins the silver comprising layer 126. Herein, the electrically insulating layer 134 may be or comprise an electrically insulating varnish, preferably a photoresist and/or a solder resist; however, other electrically insulating materials may also be feasible.

In a particular example, the protective layer 128 may comprise a lacquer sheet having a thickness of 5 μm to 40 μm. By irradiating the lacquer sheet with a laser beam a first portion may be ablated, thereby generating an ablation pattern on the silver comprising layer 126. The material of the protective layer 128 may at least partially be destroyed, for example by sublimation due to a transfer of energy. The transfer of energy, such as heat, may be locally limited.

For a purpose of laser ablation, a pulsed laser may, preferably, be used. Energy of a pulse may be less than 40 μJ. Specifically, the laser may be configured for irradiating the layer of sensing material by using ultra short laser pulses in a fashion that the first portion may be removed within a very short period of time such that diffusion of heat into a preserved second portion may be minimized. The pulse length may be limited to less than 12.5 ps. For example, the laser may be configured for generating a laser beam in the UV spectral range. Specifically, a laser having a wavelength of 355 nm may, preferably, be used. For the purpose of laser ablation, a frequency tripled solid state laser emitting at a wavelength of 355 nm having a pulse duration of less than 12.5 ps and a pulse repetition rate of 400 kHz may, preferably be used. However, further kinds of lasers may also be feasible.

The ablation pattern may, alternatively, be drawn by scanning the laser beam across the protective layer 128. For example, the protective layer 128 may be irradiated using at least one scanning process. The ablation rate may depend on pulse energy, laser wavelength, pulse length, pulse repetition rate, beam diameter on the irradiated surface, scanning velocity, pulse overlap, overlap of adjacent scanning lines, spectral absorption coefficient of the irradiated material, and ablation threshold of the irradiated material as comprised by the protective layer 128. During or subsequent to the ablation process, ablated material may be removed by any process known in the art, such as by using at least one dust extractor or the like; however further kinds of removing ablated material may also be conceivable.

Exemplary conditions as shown in Table 1 for a laser system 3D Micromac microCut TMS; UKP-Laser Hyper Rapid 50-SW 355 were used:

| process | laser ablation lacquer chemistry | cut |
| --- | --- | --- |
| power (counts) | 550; approx. 1 W | 800 |
| pulse rate/kHz | 400 | 400 |
| number of repetitions | 3 | 20 |

However, using different conditions for this purpose may also be feasible.

FIG. 2 schematically illustrates a preferred exemplary embodiment of a method 140 for producing the analyte sensor 110 according to the present invention.

A substrate 112 is provided in a providing step 144 according to step a). As already indicated above, the substrate 112 may be an individual substrate already exhibiting the final sizes of the analyte sensor 110 or, preferably, a raw substrate having the same insulating material and the same thickness as the substrate 112 but differing from the substrate 112 by a length and a width. The individual analyte sensors 110 each comprising the substrate 112 may be isolated from the raw substrate by using a cutting process as described above in more detail. For case of processing, the raw substrate may, preferably, be designated for being used in a roll-to-roll process and may, in particular, be provided as a roll.

The conductive layer 122, 124 is applied in a first applying step 146 according to step b) to the substrate 112, preferably, in a fashion that it may directly cover, preferably fully, both the first side 114 and the second side 116 of the substrate 112.

In an optional structuring step 148, the electrically insulating layer 134 may be applied according to optional step g) to cover a portion 136 of the conductive layer 124, wherein the remaining portion on the conductive layer 124 may, preferably, be allocated for the silver comprising layer 126.

The silver comprising layer 126 is applied in a second applying step 150 according to step c) in a manner that it partially covers the conductive layer 124 as applied to the second side 116 of the substrate 114 outside the portion 136 as covered by the electrically insulating layer 134.

The protective layer 128 is applied in a third applying step 152 according to step d) in a manner that it, preferably fully, covers the silver comprising layer 126.

In order to provide access to the silver comprising layer 126 for the body fluid comprising the one or more analytes the one or more holes 130 are generated in the protective layer 128 during a generating step 154. Herein, as further indicated above, the one or more holes 130 the protective layer 128 may, preferably, be generated by using an ablative process, specifically laser ablation.

The working electrode 118 is prepared in a preparing step 156 according to step f), preferably on an opposite side of the substrate 112. In the embodiment, in which the substrate 112 may be a raw substrate, the raw substrate is cut in a cutting step (not depicted here) into appropriate pieces, specifically by using a laser cutting process, in order to obtain the desired analyte sensor 110.

As schematically illustrated in FIG. 2A, the working electrode 118 may be prepared in the preparing step 156 after preparing the silver comprising electrode 120. However, in an alternative embodiment as depicted in FIG. 2B, the working electrode 118 may be prepared in the preparing step 156 prior to preparing the silver comprising electrode 120.

FIG. 3 schematically illustrates an explosion drawing of a portion of a further preferred exemplary embodiment of the analyte sensor 110 showing the arrangement of the various layers which are located on the second side 116 of the planar substrate 112. Accordingly, the substrate 112 is coated with the conductive layer 124 in a fashion that it may, preferably fully, cover the second side 116 of the substrate 112. Further, the electrically insulating layer 134 is applied to cover the portion 136 of the conductive layer 124 while the silver comprising layer 126 covers the remaining portion of the conductive layer 124, thereby generating a side-by-side arrangement of the conductive layer 124 and the adjacent silver comprising layer 126 on the conductive layer 124. Further, the electrically conductive protective layer 128 is applied to the silver comprising layer 126 in a fashion that it, preferably fully, covers the silver comprising layer 126. Access for the body fluid comprising the one or more analytes to the silver comprising layer 126 is provided in this arrangement by the single hole 130 as schematically depicted in FIG. 3. As described above in more detail, the hole 130 may, preferably, be generated in the protective layer 128 by using an ablative process, specifically laser ablation.

LIST OF REFERENCE NUMBERS

110 analyte sensor
112 substrate
114 first side
116 second side
118 working electrode
120 further electrode
122 conductive layer
124 conductive layer
126 silver comprising layer
128 protective layer
130 holes
132 membrane
134 electrically insulating layer
136 portion
140 method for producing an analyte sensor
144 providing step
146 first applying step
148 (optional) structuring step
150 second applying step
152 third applying step
154 generating step
156 preparing step

The invention claimed is:

1. An analyte sensor for determining at least one analyte, comprising,
   a substrate;
   a working electrode and a conductive layer located on different sites on the substrate;
   a silver comprising layer partially covering the conductive layer; and
   a protective layer, which
     comprises at least one electrically conductive material, and
     covers the silver comprising layer apart from at least one hole in the protective layer, the at least one hole extending through the at least one electrically conductive material to the silver comprising layer, providing access for at least one body fluid comprising the at least one analyte to the silver comprising layer.

2. The analyte sensor according to claim 1, wherein the conductive layer, the silver comprising layer, and the protective layer form a further electrode selected from a group consisting of a counter electrode, a reference electrode, and a combined counter/reference electrode.

3. The analyte sensor according to claim 2, wherein the at least one further electrode is or comprises the combined counter/reference electrode.

4. The analyte sensor according to claim 2, wherein the working electrode is located on a first side of the substrate and wherein the further electrode is located on a second side of the substrate, wherein the first side and the second side of the substrate are positioned opposite each other.

5. The analyte sensor according to claim 4, wherein the working electrode and the further electrode are located on the substrate in a manner that a geometrical projection of a site of the working electrode onto the second side of the substrate on which the silver comprising layer is located does not result in overlap between the geometrical projection of the site of the working electrode and a site of the silver comprising layer.

6. The analyte sensor according to claim 1, further comprising an electrically insulating layer being located on a same side of the substrate as the silver comprising layer.

7. The analyte sensor according to claim 1, wherein at least one of the conductive layer or the protective layer comprise an electrically conductive carbon material.

8. The analyte sensor according to claim 1, wherein the silver comprising layer comprises Ag/AgCl.

9. The analyte sensor according to claim 1, wherein the protective layer is a hydrophobic layer.

10. The analyte sensor according to claim 1, wherein the at least one hole has a total size of 0.0005 mm$^2$ to 0.01 mm$^2$.

11. The analyte sensor according to claim 1, wherein the protective layer comprises 1 to 250 holes.

12. A method for producing the analyte sensor according to claim 1, the method comprising the steps of:
   a) providing the substrate;
   b) applying the conductive layer on the substrate;
   c) applying the silver comprising layer in a manner that it partially covers the conductive layer;
   d) applying the protective layer, which comprises the at least one electrically conductive material, in a manner that it covers the silver comprising layer;
   e) generating the at least one hole in the protective layer in a manner that it provides access for the at least one body fluid comprising the at least one analyte to the silver comprising layer; and
   f) preparing the working electrode on the substrate.

13. The method according to claim 12, wherein the at least one hole in the protective layer is generated by using an ablative process.

14. The method according to claim 13, wherein the at least one hole in the protective layer is generated by using laser ablation.

15. The method according to claim 12, further comprising a step of g) applying an electrically insulating layer on a same side of the substrate as the silver comprising layer.

16. The method of claim 12 wherein step e) is performed after step d).

* * * * *